Figure 1:
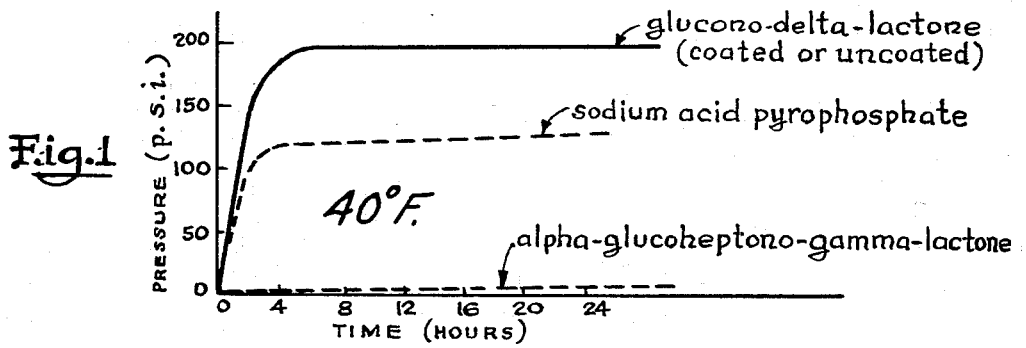

United States Patent Office 3,275,451
Patented Sept. 27, 1966

3,275,451
ALPHA - GLUCOHEPTONO - GAMMA - LACTONE CONTAINING PREMIX FOR LEAVENED BAKED FOOD PRODUCTS
Arthur G. Holstein, 1219 Glen Rock Ave., Lake Bluff, Ill.
Filed Jan. 2, 1964, Ser. No. 335,057
5 Claims. (Cl. 99—94)

My invention relates to an improved food product for baking, a premix therefor, and method of making a food product. More particuarly, the invention relates to such products including alpha-gluconoheptono-gamma-lactone as at least one leavening acidulant and to methods of making food products including the same.

Non-yeast leavening compositions include a gas producing compound and one or more acidulants. As the gas producing compound, sodium bicarbonate or a carbonate is usually used. Products that have been used as the acidulants include, adipic acid, anhydrous monocalcium phosphate, citric acid, cream of tartar, fumaric acid, glucono-delta-lactone (coated or uncoated), monocalcium phosphate monohydrate, sodium acid pyrophosphate, sodium aluminum sulfate, sodium aluminum phosphate, and others. When mixed with flour, water, and other ingredients preparatory to baking, the leavening composition undergoes a chemical reaction that involves gas that is entrained in the mix. At the time of mixing, the gas evolution lowers the specific gravity of the dough or batter. Low specific gravity is essential to gas retention during baking. During baking, further gas evolution is essential to cause the mixed batter or dough to rise and thereby provide the relatively light baked product desired.

It is often necessary or at least desirable to provide for leavening action that is activated during the baking process, even though this may be long after the dough or batter is initially prepared. In commercial baking, for example, a batch of dough or batter may be made up in advance of baking and then baked as customer demand or the capacity of baking facilities requires. In the home, the batter or dough may be mixed relatively slowly, so that a relatively long time passes between commencement of the operation and the time of baking. And in the case of products such as refrigerated biscuit dough the mixing may be performed and the mixed but unbaked product sold for baking by the purchaser. In these and other practical instances where delayed leavening action is required, the principal leavening acidulant used to date has been sodium acid pyrophosphate. This product, however, is characterized by a sharp and rather bitter taste, which is imparted to the baked goods and thereby degrades the quality of the same. Other available leavening acidulants react with undue rapidity for use as slow acting acidulants, or for some other reason have not found wide commercial use.

The present invention rests on the discovery that alpha-gluconoheptono-gamma-lactone has the surprising property of providing delayed leavening action without imparting an undesirable taste or other undesired effect to the product. As described further by reference to specific examples herein, this surprising characteristic is such that a batter or dough may be mixed to the ready-for-baking condition and stored for a substantial time at ordinary room temperature or for an even longer time while frozen or at least at a refrigerated temperature, such as 45 degrees fahrenheit or lower, without activating the alpha-gluconoheptono-gamma-lactone. Thereafter when the batter or dough is baked the alpha-gluconoheptono-gamma-lactone is activated by the baking temperature to produce the required leavening. Through the use of this lactone as a component of the leavening system, it is accordingly possible to provide a desired leavening action at the time of baking despite storage of the mixed product prior to baking. As also described in detail hereafter, it is possible to provide the desired amount of instantaneous leavening action through the medium of a rapidly acting or instantaneous leavening compound.

It is therefore a general object of the present invention to provide an improved food product for baking, a premix therefor, and a process of making a food product characterized by the presence of delayed leavening action activated by baking.

Another object of the present invention is to provide an improved food product for baking, a premix therefor, and a process of making a food product characterized by the ability to be stored in the ready-for-baking condition for a substantial period at room temperature and for a prolonged period under refrigeration without activating a defined component of the leavening acidulant, and wherein such component of the leavening acidulant is activated promptly upon baking.

Still another object of the present invention is to provide an improved food product for baking, premix therefor, and process of making a food product whereon one predetermined portion of the leavening action is activated only upon baking and another predetermined portion of the leavening action is effective at the time of mixing the material for baking.

Yet another object of the present invention is to provide an improved food product for baking, premix therefor, and process of making a food product that provides leavening action activated by baking without undesirable taste or other unfavorable effects.

It is a further object of the present invention to provide products and processes that achieve the foregoing objects in an economical, reliable, and commercially useful fashion, to the end that products and processes suitable for use in the home and in commercial bakeries are provided.

The novel features which I believe to be characteristic of the present invention are set forth with particularity in the appended claims. My invention itself, however, both as to the composition of the products and the steps of the process, together with further objects and advantages thereof, will best be understood by reference to the following description taken in connection with the accompanying drawings in which:

FIGURE 1 is a graph of representative measured rates of gas pressure increase in angel food cake batters containing alpha-gluconoheptono-gamma-lactone and other representative leavening acidulants at 40° F.

Figure 2:
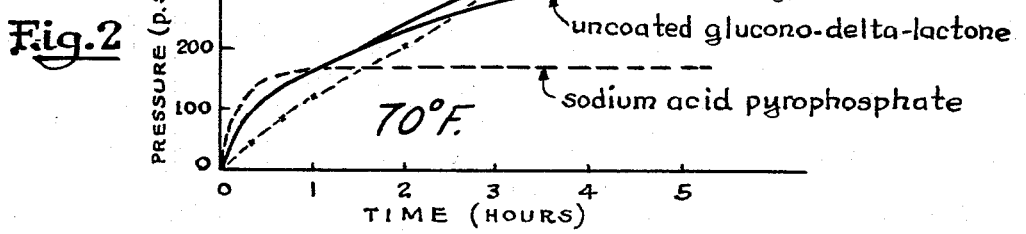
Figure 3:
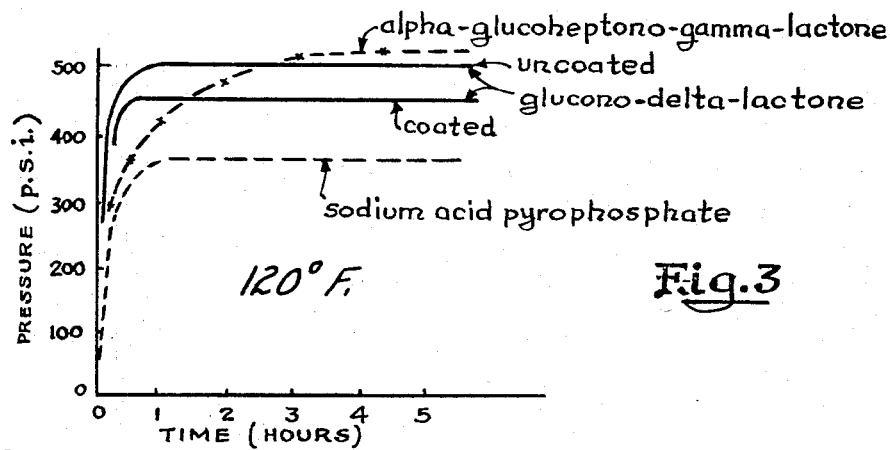
Figure 4:
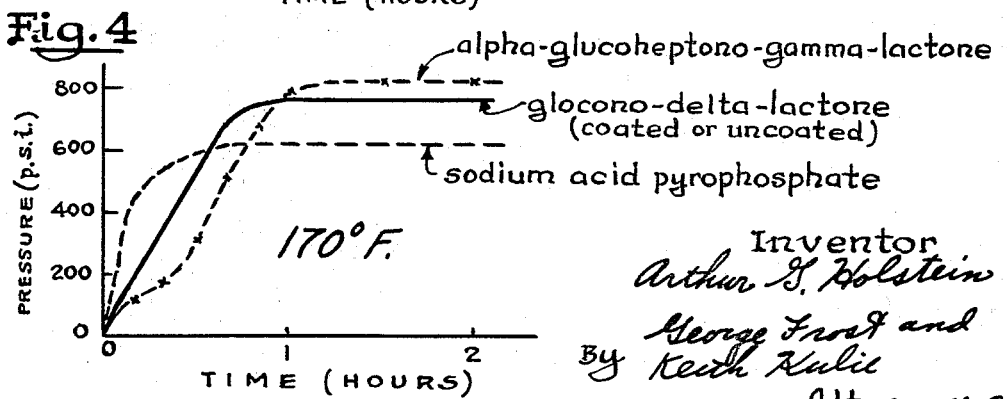

FIGURES 2, 3, and 4 are graphs of similar representative measurements taken at about 70° F., about 120° F., and about 170° F., respectively.

The products and processes of the present invention are characterized by the use of alpha-gluconoheptono-gamma-lactone as at least one component of the leavening acidulant. This product has a melting point of 151–153° C. and is conventionally illustrated by the following chemical structure formula:

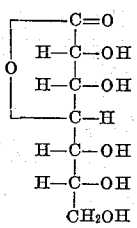

The product may be made by treating an aqueous solution of glucose with a stoichiometric equivalent of sodium cyanide to form glucose cyanohydrin, a seven membered carbon chain compound, by the so-called Kiliani reaction (see Fieser and Fieser, Organic Chemistry, 3rd ed., p. 350 et seq.). The cyanohydrin is hydrolized in the water solution to form alpha and beta sodium glucoheptonate. The alpha-sodium-glucoheptonate crystallizes readily when the solution is evaporated to form a heavy syrup and then cooled, and may be recovered by suitable filtration. The filtrate largely contains the beta sodium glucoheptonate isomer, which is relatively soluble. The alpha sodium glucoheptonate crystals may be redissolved in water and converted to the acid, as for example by passing the solution through a cation tower. The alpha-glucoheptono-gamma-lactone is then produced by concentrating the solution of the acid until crystalllization takes place. The lactone may then be separated from the mother liquor by filtration.

The exact mechanism by which alpha-gluconoheptono-gamma-lactone acts as a leavening acidulant is not known. It is believed, however, that the action is the result of two chemical reactions which take place in sequence. When the product is placed in contact with water (during the mixing of batter or dough) it is believed to undergo hydrolysis, to form alpha-glucoheptonic acid. This acid thereupon reacts with the gas producing compound, such as bicarbonate, contained in the mixed batter or dough to form carbon dioxide which is entrained in the batter or dough during baking to form the desired product. It is believed that the hydrolysis normally occurs at a substantial rate only at baking temperatures, above about 170° F., so that until baking temperature is reached the gas-producing acid is not present. At refrigerated temperature, such as about 40° F., the hydrolysis is believed to take place so slowly that the alpha-glucoheptonic-gamma-lactone is retained for a prolonged period in substantially unreacted form.

The following examples illustrate the practical application of the present invention:

*Example 1 (angle cake)*

An angel cake may be made using substantially the following ingredients:

|   | Percent by weight |
|---|---|
| Sugar | 35.9 |
| Flour | 15.2 |
| Egg whites | 41.2 |
| Starch | 1.1 |
| Water | 1.4 |
| Salt | 0.2 |
| Gum arabic | 0.4 |
| Sodium bicarbonate | 0.9 |
| Cream of tartar | 0.5 |
| Alpha-glucoheptonic-gamma-lactone | 3.2 |

A cake was made using a total weight of the above formulation of about 500 grams, together with about 359 grams of frozen egg whites. The egg whites and water were first placed in the 5 quart bowl of a Hobart N-50 mixer. The egg whites were commercial frozen whites containing sodium citrate and triethyl citrate as "whipping agents," although egg whites without such agents may be used. Both the egg whites and water were at room temperature when used. The remaining ingredients were placed on top of the egg whites and water in the bowl. The composition was mixed by a Hobart N-50 mixer using a wire whip at law speed for about 30 seconds. The walls of the bowl were then scraped down and the mixture beaten at medium speed for an additional time of about 240 seconds, at which time a fluffy batter of 0.75 specific gravity was formed. Six hundred grams of the batter was placed in an Ekco #294T angle food cake pane and baked for about 40 minutes in an electric oven at a temperature of about 350° F. The resulting cake was of close even grain, smooth texture, bright crumb color, and of bland flavor. The cake height was 100 mm. It was judged to be of excellent acceptability.

A series of cakes with generally similar formulations was made using sodium acid pyrophosphate, glucono-delta-lactone, and coated glucono-delta-lactone in lieu of alpha-glucono-heptono-gamma-lactone, these being 2.6 percent, 2.8 percent, and 3.1 percent of the mixture, respectively. These all gave cakes which were judged excellent in acceptability in the case of glucono-delta-lactone and of fair acceptability in the other instances. The cake mad with pyrophosphate had a pronounced undesirable "pyro" taste.

*Example 2 (pizza crust)*

A pizza pie crust premix was prepared by admixing substantially the following ingredients:

|   | Percent by weight |
|---|---|
| Flour | 85.8 |
| Nonfat milk solids | 1.7 |
| Sugar | 1.7 |
| Dextrose hydrate | 0.8 |
| Salt | 1.7 |
| Yeast flavoring | 1.7 |
| Sodium bicarbonate | 1.9 |
| Alpha-glucoheptono-gamma-lactone | 4.6 |

With a total amount of about 6.5 ounces of this premix, one half cup of water was added and mixed by hand. The dough thus obtained was about 61% mix and 39% water, was soft, and was non-gassy. The mixed dough was allowed to rest for five minutes and then rolled to a thickness of about 3/16 of an inch and baked upon an aluminum cookie sheet for about 18 minutes at about 400° F. An excellent tender, crisp, crust having bland flavor was obtained.

The same procedure was followed using sodium acid pyrophosphate, glucono-delta-lactone, and coated glucono-delta-lactone in lieu of alpha-glucono-heptono-gamma-lactone and in amounts of about 3.6 percent, 4 percent, and 4.4 percent, respectively. The crust produced with the sodium acid pyrophosphate possessed a strong objectionable pyrophosphate salt taste and was very tough and rubbery. The other crusts were of a bland acceptable flavor, but were adjudged to be inferior in quality to the crust made with alpha-gluconoheptono-gamma-lactone.

*Example 3 (delayed angel cake)*

Using the same ingredients and mixing technique as in the first paragraph of Example 1, an angel cake batter may be prepared. Following such preparation the batter may be temporarily stored at room temperature for a period of approximately one-half hour. The batter then may be baked as described in the first paragraph of Example 1 to provide a cake which is equivalent in characteristics to that described in Example 1.

*Example 4 (delayed angel cake)*

Using the same ingredients and mixing technique as in the first paragraph of Example 1, an angel cake batter may be prepared. Following such preparation the batter may be placed in a refrigerator at 40° F. or lower for a prolonged period, such as 12 hours. Whenever, within that period, the cake is to be baked, the batter is removed from the refrigerator and baked as described in the first paragraph of Example 1 to provide a cake that is equivalent in characteristics to that described in Example 1.

*Example 5 (delayed pizza pie crust)*

Using the same ingredients and mixing technique as in the first paragraph of Example 2, a pizza pie crust dough may be prepared. The dough may be stored at room temperature for at least about one-half hour or at 40° F. or lower for a prolonged period, such as 24 hours. The dough may be baked as described in the first paragraph of Example 2 to provide the crust of like characteristics as that described. If desired, the dough may be packaged and sold in refrigerated form for baking by the purchaser in the manner described in Example 2.

In all of the above examples specific proportions and specific ingredients are indicated for purposes of illustration. Variations may, of course, be used as desired.

In the above examples and in other applications of the present invention the alpha-gluconoheptono-gamma-lactone is used as a delayed action leavening acidulant. The action that is thus provided is illustrated graphically in FIGURES 1, 2 and 3. The alpha-gluconoheptono-gamma-lactone data for these curves is representative of that obtained by placing 50 grams of angel food cake batter, prepared as described in the first paragraph of Example 1 in a gas pressure-meter such as that employed by the American Association of Cereal Chemists to determine the beta-amylase content of flour. The gas pressure meter consists of an aluminum cup having a screw top lid secured in sealing relation to define a closed space of about 250 cc. and a pressure indicating gage. After placing a sample of batter in the cup, the lid is attached and securely screwed in place. Entrapped air is released through a valve in the lid in order to insure that the initial pressure within the cup is equal to atmospheric pressure. The instrument is then immersed in a constant temperature water bath at the temperature of the test (40° F. (4.44° C.) for FIGURE 1, 70° F. (21.1° C.) for FIGURE 2, 120° F. (49° C.) for FIGURE 3, and 170° F. (77° C.) for FIGURE 3). Pressure readings are noted at successive times to obtain the data. The data shown in the curves are representative of data obtained in tests. Considerable variations in readings were observed as between different commercial products, particularly pyrophosphate.

The curves for sodium acid pyrophosphate, glucono-delta-lactone and coated glucono-delta-lactone in FIGURES 1, 2, 3, and 4 are representative of data obtained in similar fashion, using the respective batters described in the second paragraph of Example 1.

It will be observed from FIGURE 1 (40° F.) that with the pyrophosphate and glucono-delta-lactone (coated or uncoated) batters, the gas pressure increased to a nearly-constant value in about four hours. This indicated that leavening action was taking place and that these leavening acidulants were undergoing chemical reaction that was destroying their ability further to react in leavening action if the batter were baked in an effort to make a cake. On the other hand, the gas pressure in the case of the alpha-gluconoheptono-gamma-lactone remained essentially at the initial value for the entire test period of 24 hours. This indicated that this leavening acidulant was not undergoing chemical change and was retaining its ability to react in leavening action in the event of cake baking.

The curves of FIGURE 2 show that at room temperature (about 70° F.) the batters made with pyrophosphate and the coated and uncoated glucono-delta-lactone were initially reacting in gas-producing leavening action much faster than the batter using the alpha-gluconoheptono-gamma-lactone. Within the first half hour, for example, only about 20 percent of the total leavening action of the alpha-gluconoheptono-gamma-lactone had occurred. By reason of this slower initial reaction time, the batter in the case of the alpha-gluconoheptono-gamma-lactone can be temporarily stored, or the batter may be mixed in a more leisurely manner than in the case of other acidulants. The curves of FIGURE 3 show that at about 120° F. these same effects occur but are more pronounced.

The curves of FIGURE 4 show that at about 170° F. the rate of gas evolution in the case of alpha-gluconoheptono-gamma-lactone batter has been greatly increased in relation to the rate with the other leavening acidulants shown. This indicates that at still higher temperatures, and particularly at baking temperatures such as about 360° F., the alpha-gluconoheptono-gamma-lactone batter provides quite rapid leavening action and hence a good cake, which has been found to be the case.

The curves of FIGURES 1–4 are intended to be illustrative only and to show general effects rather than specific detail. While the curves of FIGURES 1, 2, 3, and 4, are for an angel cake batter generally, similar results can be obtained using other doughs and batters, such as the pizza pie crust dough discussed above.

In many applications of the present invention, as in Examples 1, 3, and 4, discussed above, the alpha-glucono-heptono-gamma-lactone is used as a delayed leavening acidulant in conjunction with a rapid-acting leavening acidulant. The latter provides gas formation and therefore the desired batter specific gravity. In Example 1, cream of tartar is used as the rapid acting leavening agent. It reacts promptly with the sodium bicarbonate during the mixing process to provide the desired low specific gravity batter. In the pizza crust of Examples 2, 5, and 6, it is not necessary to provide a low specific gravity dough, so that in this instance, the alpha-glucono-heptono-gamma-lactone is used without a rapid-acting leavening acidulant.

The alpha-glucoheptono-gamma-lactone may be incorporated in a complete premix used for making dough or batter which is to be baked to prepare a food product such as pie crust, cake, biscuits, etc. The complete premix should contain the alpha-glucoheptono-gamma-lactone, the rapid acting leavening acidulant (if any), the sodium bicarbonate or other leavening reactant in sufficient quantity to react with the total quantity of acidulant, and such other ingredients (such as sugar, flour, flavoring, etc.) as may be desired. Such premix is mixed with water and the other ingredients not included in it and the batter or dough prepared in the usual fashion. Alternatively, the alpha-glucoheptono-gamma-lactone may be incorporated in a partial premix, such as a baking powder. In this event, ingredients such as sugar, flour, and the like, are added before or during the mixing process to make dough or batter for baking.

When a dough or batter is completely mixed and is stored at room temperature, bacterial contamination can be a problem. This problem can be minimized, or overcome, by the use of coverings or other measures to prevent access of additional bacteria to the dough or batter, gamma ray or other sterilizing techniques, or a number of such measures. The important point is that, in a dough or batter made in accordance with the present invention, the acidulant includes a component activated by the baking process and does not impose a short time limit on the storability of the dough or batter.

The delayed action of the alpha-glucoheptono-gamma-lactone in accordance with the present invention is useful for purposes other than storing the dough or batter prior to baking. For example, in yeast leavened canned baked bread products, the product canned should have a pH of 4.8 or less, to retard bacteria. This low pH is on the borderline of the range at which the yeast metabolism is inactivated. If normal acid is added to provide a resultant pH of 4.8 or less, gas evolution is seriously retarded. If the alpha-glucoheptono-gamma-lactone is used, the immediate acidification does not take place, so that the yeast can ferment rapidly and normally, while during the baking process the lactone is activated and effectively lowers the pH. In such product it is possible to mix the lactone and yeast in the product as mixed. The yeast undergoes normal fermentation, causing the product to rise. The lid on the container can be clinched without a seal and the product baked. This activates the lactone and reduces the pH as necessary. The container is then sealed to provide canned bread having pH as determined by the lactone, but had a higher pH during yeast activity.

The term baking temperature as herein used means the conventional baking temperature as read by an oven thermometer. This value is not, of course, the temperature of the food product, which does not exceed about 215 degrees fahrenheit even in the case of a product containing considerable sugar. The baking process is a matter of heat transfer and wide variations in the temperature as read by an oven thermometer may take place for the same temperature of the product being baked.

The coated glucono-delta-lactone, discussed above, was glucono-delta-lactone coated with 10 percent calcium stearate.

In the appended claims the term rapid acting leavening acidulant is used to designate such acidulant, such as cream of tartar, glucono-delta-lactone, or the like that is characterized by substantial leavening activity at room temperautre and during the mixing process.

While I have shown and described specific embodiments of the present invention, it will, of course, be understood that numerous alternatives may be used to obtain the advantages of alpha glucoheptono-gamma-lactone as a baking-activated leavening acidulant as herein described. The appended claims are intended to cover all such modifications and alternatives as fall within their true spirit and scope.

What I claim as new and desire to secure by Letters Patent of the United States is:

1. A premix with multiple leavening action for use in the preparation of a leavened baked food product from the group consisting of angel food cake, pizza crust, delayed angel food cake and delayed pizza pie crust, said premix comprising:
    a compound effective to produce carbon dioxide when acidulated;
    at least one rapid acting acidulant effective to react promptly with a minor proportion of said compound when the same are mixed in an aqueous mixture at normal mixing temperature and being in amount from about 1 to about 2 parts by weight of the total premix;
    and a quantity of alpha-glucoheptono-gamma-lactone sufficient to react in leavening action with substantially the remainder of said compound during baking to provide a baking-activated leavening action, said lactone being in amount of about 3 to about 5 parts by weight of the total premix.

2. A premix for use in the preparation of angel food cake, said premix comprising an admixture including:
    wheat flour, sugar, and egg whites in the relation of about 15, 35, and 40 parts by weight of the premix, respectively;
    and a leavening system comprising sodium bicarbonate in the amount of about one part by weight of the premix, alpha-glucoheptono-gamma-lactone in the amount of about three parts by weight of the premix, and a rapid acting leavening agent in substantially the amount stoichiometrically capable of reacting with the remaining sodium bicarbonate.

3. A premix for use in the preparation of angel food cake, said premix comprising an admixture including:
    wheat flour, sugar, and egg whites in the relation of about 15, 35, and 40 parts by weight of the premix, respectively;
    and a leavening system comprising sodium bicarbonate in the amount of one part by weight of the premix, alpha-glucoheptono-gamma-lactone in the amount of about three parts by weight of the premix, and cream of tartar in the amount of about one-half part by weight of the premix.

4. A premix for use in the preparation of leavened baked foods requiring a predetermined quantity of gas evolution during baking, said premix comprising: flour, sodium bicarbonate; and alpha-glucoheptono-gamma-lactone, the quantity of said lactone being in an amount of about 3 parts by weight of the total premix and sufficient to evolve said quantity of gas upon reacting with sodium bicarbonate, and the quantity of sodium bicarbonate being in an amount of about 1 part by weight of the premix and sufficient to react with the lactone during baking.

5. A premix for use in the preparation of leavened baked foods, said premix comprising, flour, a compound effective to produce leavening gas when acidulated, a rapid acting acidulant in amount sufficient to provide a predetermined maximum specific gravity to the premix during and immediately after mixing of the premix with aqueous ingredients in the making of food, and alpha-glucoheptono-gamma-lactone, the amount of said lactone being about 3 parts by weight of the total premix, said compound being sufficient to provide substantially the degree of leavening required for said food during baking.

References Cited by the Examiner

"Cereal Science Today," vol. 4, No. 4, pages 96 to 99, April 1959.

A. LOUIS MONACELL, *Primary Examiner.*

RAYMOND N. JONES, *Examiner.*